(12) United States Patent
Liu

(10) Patent No.: US 8,136,423 B2
(45) Date of Patent: Mar. 20, 2012

(54) MULTIPLE TURN MECHANISM FOR MANUAL LUMBAR SUPPORT ADJUSTMENT

(75) Inventor: Jintao Liu, Windsor (CA)

(73) Assignee: Schukra of North America Co., Tecumseh, Ontario (CA)

(*) Notice: Subject to any disclaimer, the term of this patent is extended or adjusted under 35 U.S.C. 154(b) by 0 days.

(21) Appl. No.: 11/042,648

(22) Filed: Jan. 25, 2005

(65) Prior Publication Data

US 2006/0163924 A1 Jul. 27, 2006

(51) Int. Cl.
*F16C 1/12* (2006.01)
(52) U.S. Cl. .................. 74/501.6; 74/421 R
(58) Field of Classification Search .......... 74/414, 74/421 A, 421 R, 25, 501.6, 502.2, 505, 507, 74/488, 489
See application file for complete search history.

(56) References Cited

U.S. PATENT DOCUMENTS

| | | | |
|---|---|---|---|
| 1,965,878 A | 7/1934 | Briggs | |
| 2,750,994 A | 6/1956 | Howell, Jr. | |
| 3,232,653 A * | 2/1966 | Wilson | 292/169.18 |
| 3,429,180 A | 2/1969 | Flensburg | |
| 3,631,951 A | 1/1972 | Quenneville | |
| 3,726,370 A | 4/1973 | Hubbard, Jr. | |
| 3,759,358 A | 9/1973 | Quenneville | |
| 3,796,292 A | 3/1974 | Harrison | |
| 3,876,184 A | 4/1975 | Eudy | |
| 3,965,400 A * | 6/1976 | Tolliver | 399/100 |
| 4,111,031 A * | 9/1978 | Vennemeyer et al. | 72/359 |
| 4,494,709 A | 1/1985 | Takada | |
| 4,614,257 A | 9/1986 | Harada et al. | |
| 4,778,138 A | 10/1988 | Yamada | |
| 4,786,110 A | 11/1988 | Mahling et al. | |
| 4,817,771 A | 4/1989 | Iten | |
| 5,197,780 A * | 3/1993 | Coughlin | 297/284.7 |
| 5,199,310 A * | 4/1993 | Yoshimura | 74/89.2 |
| 5,211,368 A | 5/1993 | Kitamura | |
| 5,217,278 A * | 6/1993 | Harrison et al. | 297/284.7 |
| 5,302,002 A | 4/1994 | Nagasaka | |
| 5,681,005 A | 10/1997 | Ligon, Sr. et al. | |
| 5,704,687 A | 1/1998 | Klingler | |
| 5,794,470 A | 8/1998 | Stringer | |
| 5,794,479 A | 8/1998 | Schwarzbich | |
| 5,842,659 A | 12/1998 | Ligon, Sr. et al. | |
| 5,896,703 A * | 4/1999 | Wright et al. | 49/339 |

(Continued)

FOREIGN PATENT DOCUMENTS

DE 3403586 8/1985

(Continued)

*Primary Examiner* — James Pilkington
(74) *Attorney, Agent, or Firm* — Michael Best & Friedrich LLP

(57) ABSTRACT

An actuator is disclosed. The actuator includes: an output gear, a pinion, a drive shaft, a housing, and a spring. The output gear is adapted to receive a traction element. The pinion is in driving communication with the output gear. The drive shaft is interconnected with the pinion. The housing is adapted to receive the output gear and the drive shaft. The coil spring is circumjacent the drive shaft and located in a position intermediate the drive shaft and the housing, whereby rotation of the drive shaft causes the coil spring to frictionally disengage from the housing such that the output gear may rotate.

17 Claims, 10 Drawing Sheets

U.S. PATENT DOCUMENTS

| | | | |
|---|---|---|---|
| 6,158,300 A | 12/2000 | Klingler | |
| 6,212,965 B1 | 4/2001 | Hochmuth | |
| 6,334,651 B1 * | 1/2002 | Duan et al. | 297/284.4 |
| 6,652,028 B2 * | 11/2003 | McMillen | 297/284.4 |
| 6,691,851 B2 * | 2/2004 | Liu et al. | 192/223.2 |
| 6,698,677 B1 | 3/2004 | Happ et al. | |
| 6,814,407 B2 * | 11/2004 | Mundell | 297/284.4 |
| 2005/0121940 A1 * | 6/2005 | Kleinmann et al. | 296/146.4 |
| 2006/0016288 A1 * | 1/2006 | Kawakami | 74/502.2 |

FOREIGN PATENT DOCUMENTS

| | | |
|---|---|---|
| DE | 19933285 | 1/2001 |
| EP | 0885164 | 2/1997 |
| EP | 1101967 | 5/2001 |
| GB | 2316604 | 3/1998 |
| WO | 01/89063 | 11/2001 |

* cited by examiner

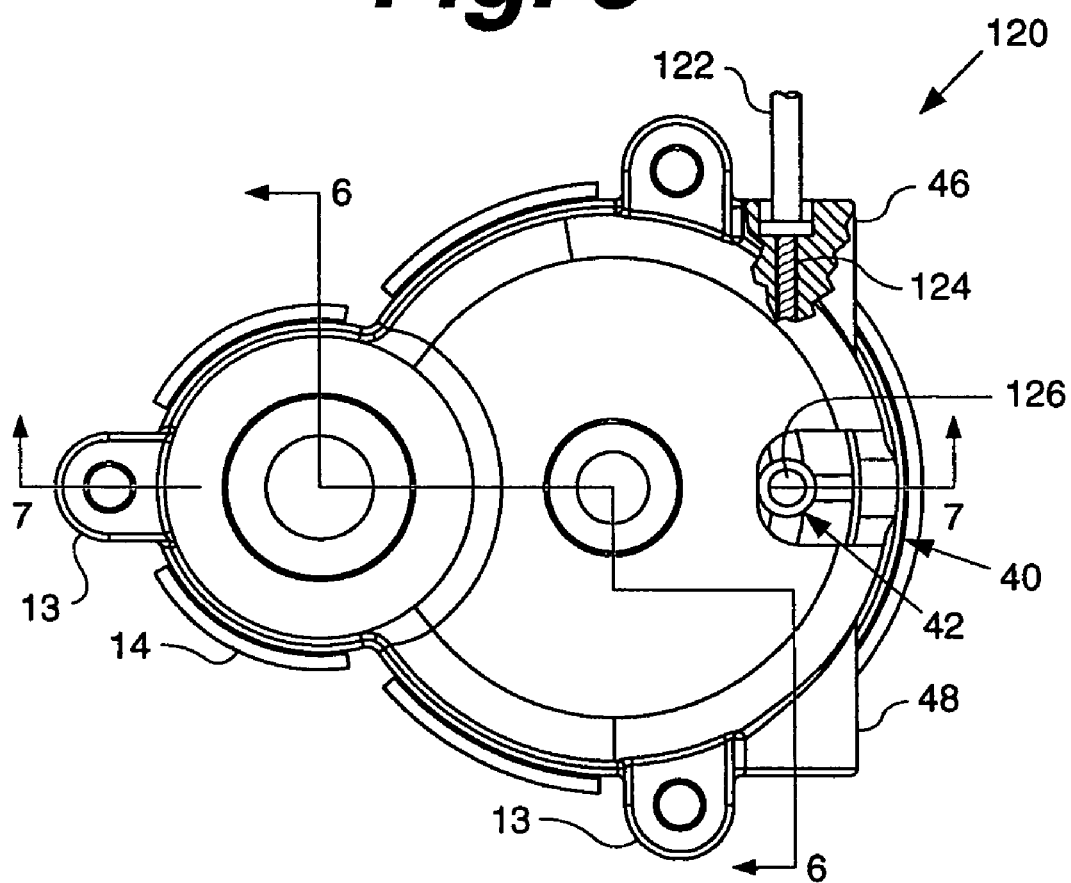

MULTIPLE TURN MECHANISM FOR MANUAL LUMBAR SUPPORT ADJUSTMENT

CROSS-REFERENCE TO RELATED APPLICATIONS

Not applicable.

BACKGROUND OF THE INVENTION

1. Field of the Invention

This invention relates generally to actuators and, more particularly, to a transmission improvement for an actuator.

2. Related Art

Many mechanical devices need to be moved to a user selected position and then held there against a force that is biased to return the device to its original position. Such devices are commonly used for ergonomic supports in seating, especially lumbar supports for automobile seats. Lumbar supports exert a comfortable force against the lumbar spine of a seat occupant. This force is applied mechanically through a wide variety of configurations including arching, bending, tightening, extending or otherwise moving a pressure surface. Pressure surfaces are of an equally wide variety including straps, paddles, "baskets," arching surfaces, bowed surfaces and so forth. These devices must allow the user to select a desired position for the pressure surface, and thereafter hold that position after the user has released whatever device and linkage has been used to move the pressure surface to the selected position. The linkages are of a wide variety including rods, levers, springs, cables, and especially coaxial traction cables such as Bowden cables. The linkage, for example a Bowden cable, has a connection to the lumbar support at one end and a connection to an actuator at the other end. The actuator is positioned where the user may operate it, typically at the edge of the seat.

There is a great variety of actuator structures used for these purposes, both mechanical and electrical. They share in common the function of moving the pressure surface to a selected position, and then holding the pressure surface in that position against a force exerted by the seat occupant's weight. That force is biased towards returning the pressure surface to its original position, which is usually flat. The most common linkage, the Bowden cable, has a flexible conduit, also called a "sleeve" or "sheath," through which runs a coaxially sliding wire. Actuators have a seat for the end of the sleeve and seat for the end of the wire. The opposite ends of the wire and sleeve are connected to different portions of the lumbar or other ergonomic support, such that pulling the wire through the sleeve moves the pressure surface to the desired position. Accordingly, the most commonly used actuators are designed to pull a Bowden cable wire through a Bowden cable sleeve. The actuators must exert the force necessary to pull the wire through the sleeve to actuate the lumbar support. They must also hold the wire against the return force of the passenger's weight on the lumbar support pulling the wire back into the sleeve. In addition the actuators must also be able to release the holding force from the wire so that the user may return the ergonomic device to its original position or to another selected position.

Actuators achieve these necessary functions of movement, holding and release through a variety of mechanisms. Electronically powered actuators frequently use gears connected to take up wheels or drums for pulling the Bowden cable wire. Manual actuators may also use gears and take up drums, but more typically include a brake, ratchet or clutch. Brakes, ratchets and clutches are powered by levers or hand wheels turned by the users hand.

There remains a continuing need in the art for reducing the size and the profile of the assembled actuator. There also remains a continuing need in the art for easing and streamlining assembly of the component parts of the actuator. Finally, there is a continuing need to reduce the number, and consequently the expense, of the components to be assembled into actuators.

SUMMARY OF THE INVENTION

The invention is an actuator having an output gear, a pinion, a drive shaft, a housing, and a spring. The output gear is adapted to receive a traction element. The pinion is in driving communication with the output gear, and the drive shaft is interconnected with the pinion. The housing is adapted to receive the output gear and the drive shaft.

The spring is circumjacent the drive shaft and located in a position intermediate the drive shaft and the housing. In a static state, the spring frictionally engages the housing to prevent rotation of the drive shaft. Because the pinion is connected to the drive shaft, the spring also prevents rotation of the pinion. Moreover, due to the engagement of the pinion with the output gear, the spring also prevents rotation of the output gear. However, when a dynamic force is applied to the drive shaft, such as when the drive shaft is rotated via a knob or lever, the spring is disengaged, thereby allowing rotation of the drive shaft, and, thus, the pinion and the output gear. Because the spring imparts only a nominal stress on the housing and the drive shaft, it is possible to make the housing and the drive shaft from plastic.

The actuator may be used to operate an ergonomic device, such as a lumbar support. As an example, the output gear may be rotated to draw or compress a traction element for adjustment of the ergonomic device. When a dynamic force is applied to the drive shaft, the spring frictionally disengages from the housing to allow rotation of the output gear, and thus movement of the traction element. When the dynamic force is released, the spring frictionally engages the housing such that the output gear is locked in position, thereby preventing further movement of the traction element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a top view of the first embodiment;

DETAILED DESCRIPTION OF THE PREFEREED EMBODIMENTS

The following description of the preferred embodiment(s) is merely exemplary in nature and is in no way intended to limit the invention, its application, or uses.

Figure 1:
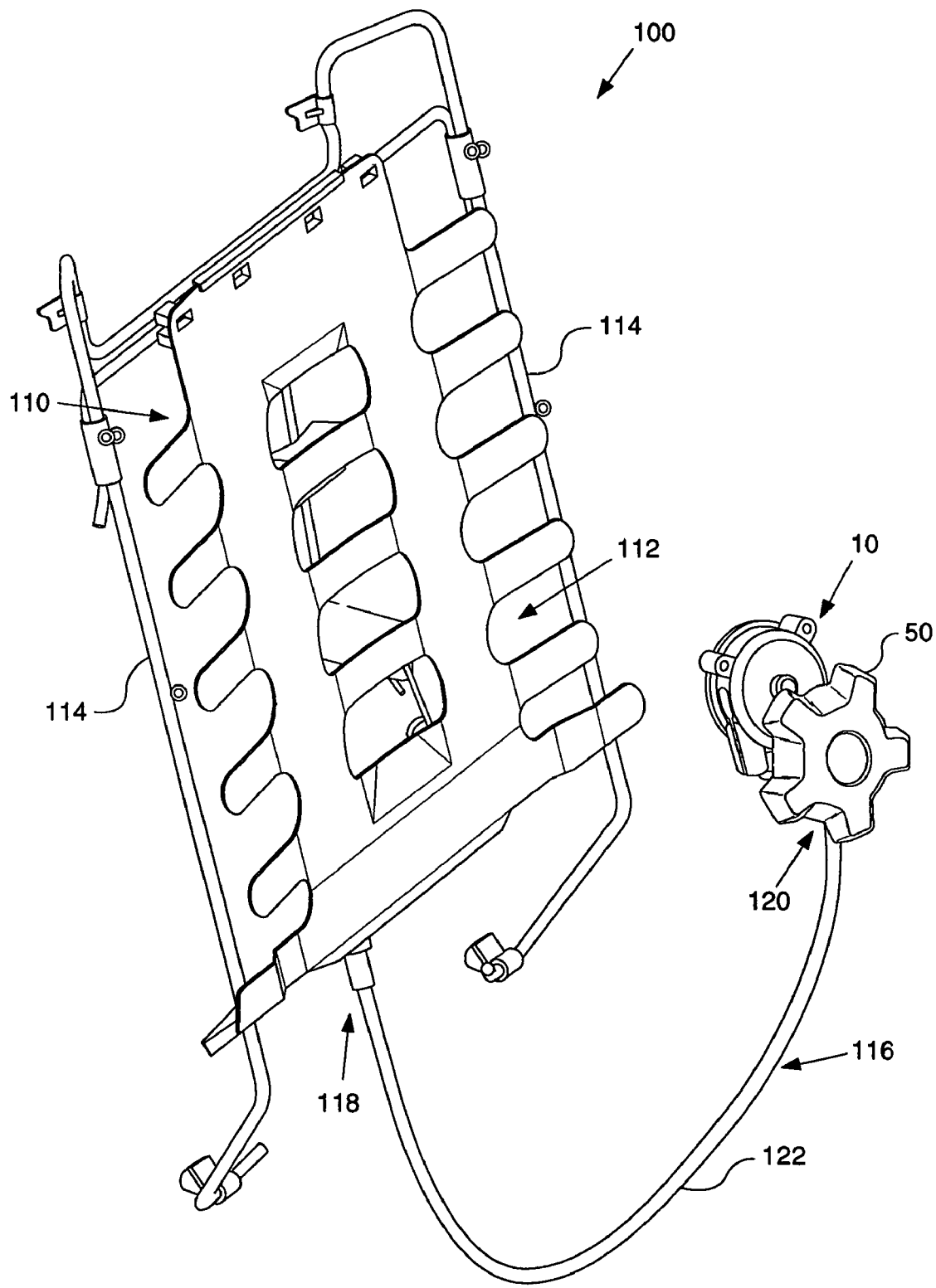
FIG. 1 is a perspective view of an ergonomic device with an actuator of the present invention attached.

FIG. 1 illustrates a typical ergonomic device. In the depicted embodiment, the ergonomic device is a lumbar support 100 with an actuator 10 of the present invention installed. The lumbar support 100 has a fixed portion 110 and an arching portion 112. The arching portion 112 slides upon guide rails 114, which may be attached to a seat frame (not shown).

The arching portion 112 is moved via a traction device. In the depicted embodiment, the traction device is a bowden cable 116. The bowden cable 116 is comprised of an outer, flexible sleeve 122, which retains and directs a wire 124 (best seen in FIG. 5) within the sleeve which can slide co-axially in and out of the sleeve. A first end 118 of the bowden cable 116 is attached to the arching portion 112, and a second end 120 is attached to the actuator 10. The actuator 10 applies traction to the bowden cable wire 124 when a seat occupant rotates a knob 50. The knob 50 may alternatively be a lever or other device giving mechanical advantage. This tractive force draws the bowden cable wire 124 through the bowden cable sleeve 122 causing the arching portion 112 to move along the guide rails 114, whereby the arching portion 112 bows outwardly to provide a lumbar supporting arch.

Hence, it is apparent that the most rudimentary function of any actuator is to draw the bowden cable wire 124 through the bowden cable sleeve 122 for operation of the ergonomic device. If an alternative traction device were elected as a design choice, the most rudimentary function of the actuator would remain to draw the tractive device, whether it is a rod, cable, or otherwise, in a direction applying tractive force to actuate the ergonomic device. The present invention may be applied to any such tractive devices. In another alternative design choice, compressive pressure may be used to bow an archable surface. The present invention may likewise be used to drive such a compressive mechanism.

FIGS. 2-8 illustrate a first embodiment of the actuator 10. The actuator 10 includes a housing 12, a cap 14, a pinion 16, a drive shaft 18, an output gear 20, a gear shaft 22, and a spring 24. In some embodiments, the housing 12 includes a plurality of mounting ears 13. As examples only, the housing 12 and the drive shaft 18 may be made of plastic, whereas the cap 14, the pinion 16, and the output gear 20 may all be made of metal. Those skilled in the art, however, will understand that all of the components could be made of metal. The cap 14 is adapted for mounting to the housing 12. In the depicted embodiment, the cap 14 includes rib stiffeners 54 to add rigidity to the cap 14.

Figure 3:
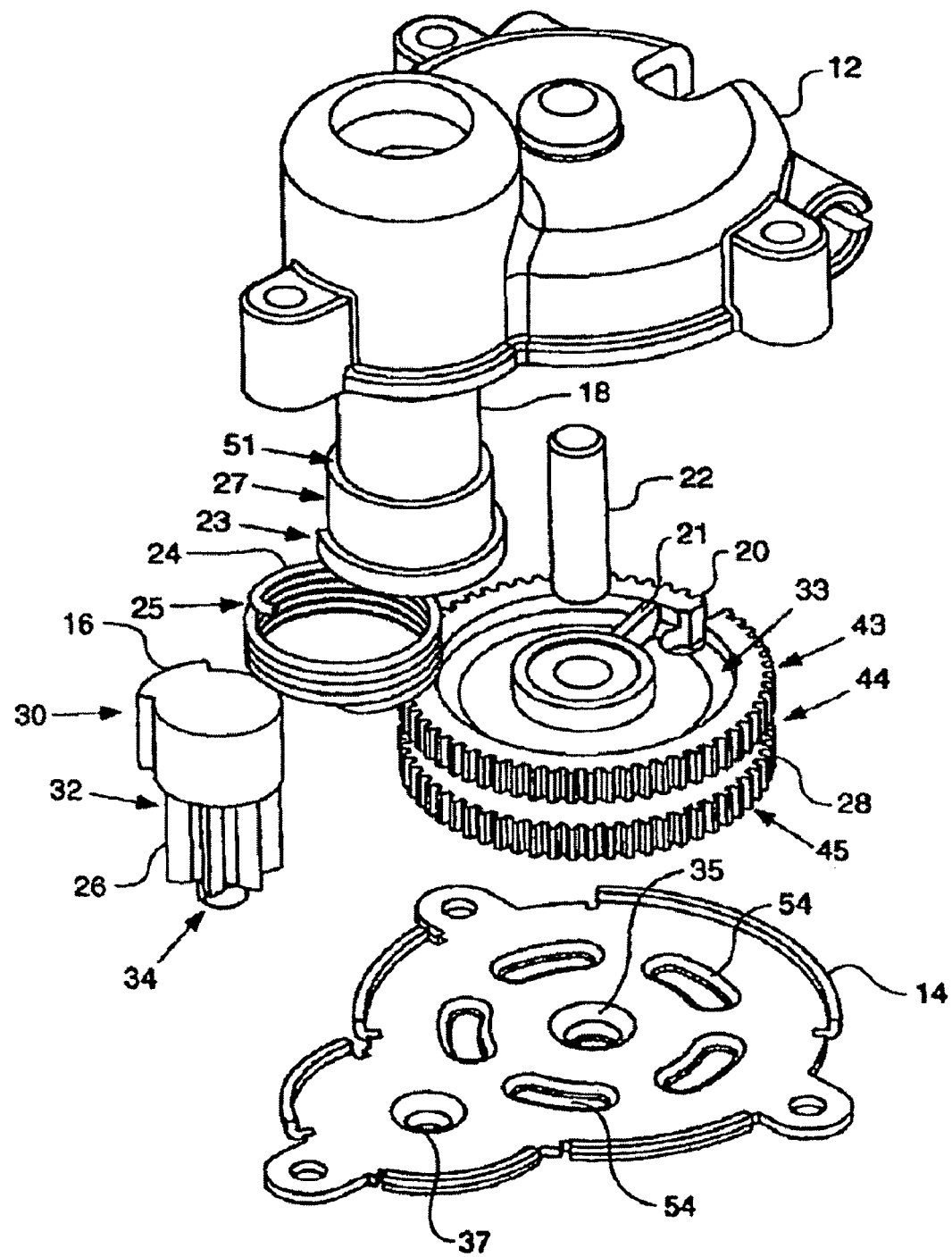
FIG. 3 is an exploded view of the first embodiment.

As best seen in FIG. 3, the pinion 16 has a locking portion 30, a geared portion 32, and a bearing portion 34. The locking portion 30 is designed to inter-lock with an inner portion 31 (best seen in FIG. 7) of the drive shaft 18. While in the depicted embodiment the locking portion 30 is keyhole-shaped, other shapes may be used. What is significant is that the pinion 16 inter-locks with the drive shaft 18 such that the pinion 16 and the drive shaft 18 rotate together. Moreover, in some embodiments, the pinion 16 and the drive shaft 18 may be configured as one piece.

The geared portion 32 mates with the output gear 20. In the depicted embodiment, the geared portion 32 has first gear teeth 26 that mesh with second gear teeth 28 of the output gear 20. A lubricant (not shown), such as grease, may be applied to the first gear teeth 26 and the second gear teeth 28 in some embodiments. While gear teeth are used in the depicted embodiment to mate the pinion 16 and the output gear 20, other similar features may be used. What is important is that the pinion 16 and the output gear 20 are locked together so that they cannot rotate independently of one another. It is important to note that the arrangement of the pinion 16 and the output gear 20 provide an effective gear reduction. In the depicted embodiment, the pinion 16 rotates about 4.5 times for each revolution of the output gear 20. In this manner, a high speed but low torque rotation of the pinion 16 may be used to rotate the output gear 20.

The bearing portion 34 supports the pinion 16. In the depicted embodiment, the bearing portion 34 has a cylindrical shape. The bearing portion 34 is received by a first void 37 in the cap 14. In some embodiments, lubricant, such as grease, may be applied to the first void 37 to reduce friction between the cap 14 and the bearing portion 34. Thus, the pinion 16 and the drive shaft 18 rotate about the first void 37 and the bearing portion 34.

The output gear, or pulley, 20 rotates about the gear shaft 22, which is affixed to the housing 12 and the cap 14. Lubricant, such as grease, may be applied to the gear shaft 22 in some embodiments. In the depicted embodiment, the housing 12 and the cap 14 each have a second void 35 that receive a respective end of the gear shaft 22. Thus, the gear shaft 22 is captured between the housing 12 and the cap 14. In the depicted embodiment, the gear shaft 22 has a diameter of 5 mm. The output gear 20 depicted in FIG. 3 includes a recess 33 and a stop 21 located in the recess 33. The stop 21 extends radially from the center of the output gear 20. The stop 21 and the recess 33 are explained in greater detail below.

Figure 6:
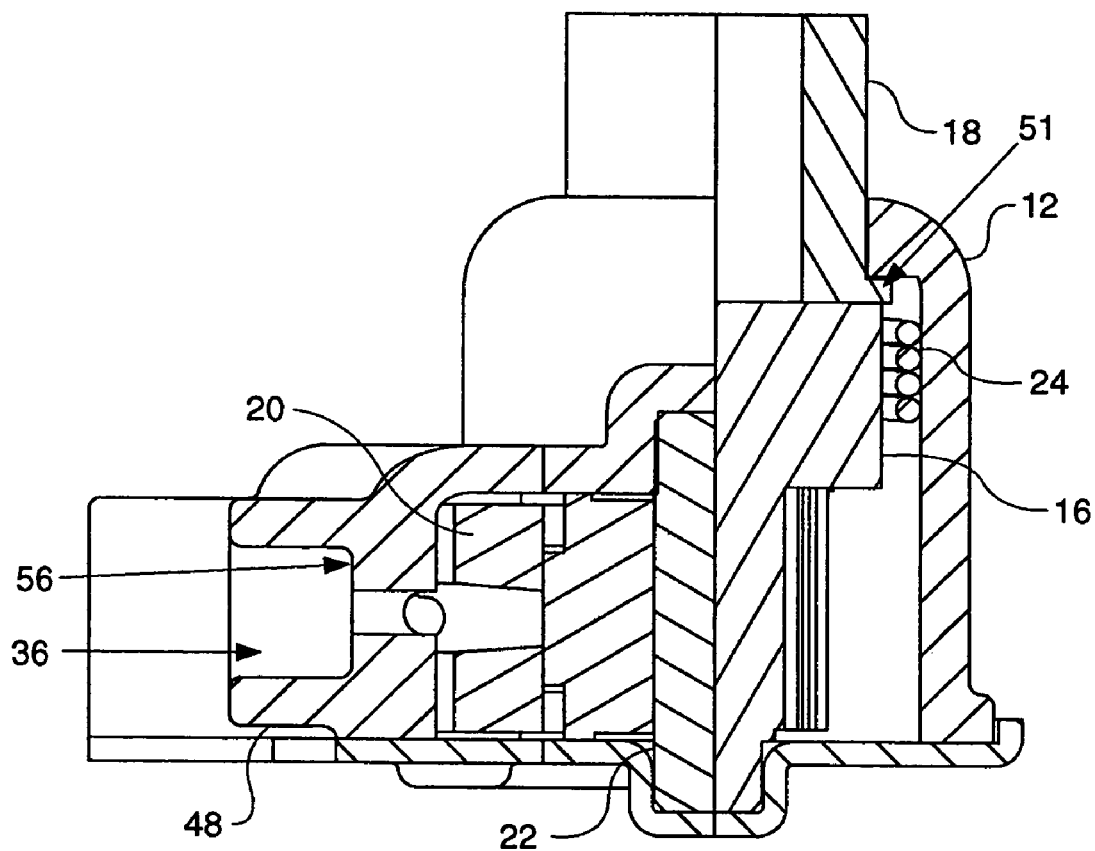
FIG. 6 is a sectional view of the actuator taken along line 6-6 in FIG. 5.
Figure 7:
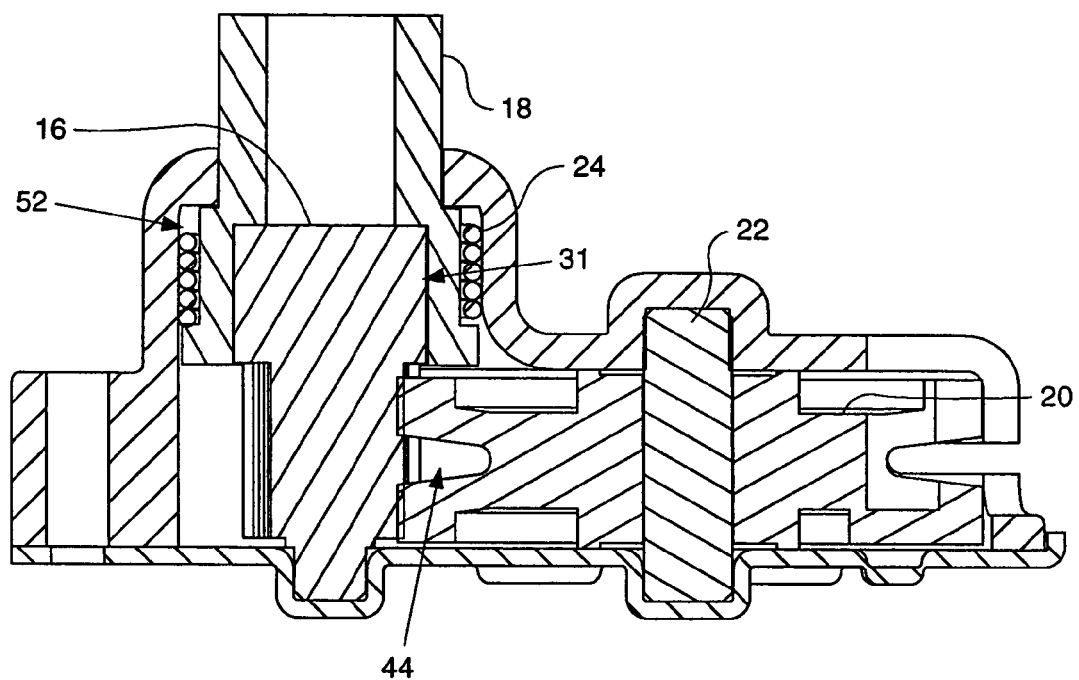
FIG. 7 is a sectional view of the actuator taken along line 7-7 in FIG. 5.

The drive shaft 18 rotates within the housing 12 and slides over the pinion 16, thereby engaging it. The drive shaft 18 includes a mounting surface 29. A device providing mechanical advantage may be mounted to the mounting surface 29. As an example, the knob 50 may be mounted to the mounting surface 29, and a user may rotate the drive shaft 18 via the knob 50. The drive shaft 18 has a first shoulder 23 and a guide surface 27. The drive shaft 18 also includes a second shoulder 51. As best seen in FIG. 6, the second shoulder 51 locates the drive shaft 18 relative to the housing 12.

The spring 24 is located intermediate the drive shaft 18 and the housing 12. In other words, the spring 24 lies circumjacent the drive shaft 18 and adjacent the housing 12. In the depicted embodiments, the spring 24 lies over the guide surface 27 and rests upon the first shoulder 23. The spring 24 selectively engages an inner surface 52 (best seen in FIG. 7) of the housing 12. The diameter of the spring 24 is such that it has a press fit with the housing 12. In a static state, the spring 24 frictionally engages the housing 12 to prevent rotation of the drive shaft 18. Because the pinion 16 is connected to the drive shaft 18, the spring 24 also prevents rotation of the pinion 16. Moreover, due to the engagement of the pinion 16 with the output gear 20, the spring 24 also prevents rotation of the output gear 20. Significantly, due to the gear reduction arrangement of the pinion 16 and the output gear 20, only a small braking torque by the spring 24 is required to brake the pinion 16 and, thus, the output gear 20.

In a dynamic state, the spring 24 is frictionally disengaged from the housing, thereby allowing rotation of the drive shaft 18, and, thus, the pinion 16 and the output gear 20. Because the spring imparts only a distributed nominal stress on the housing 12 and because the pinion 16 requires a small braking torque, it is possible to make the housing 12 from plastic, thereby reducing the overall cost of the actuator 10.

Figure 4A:
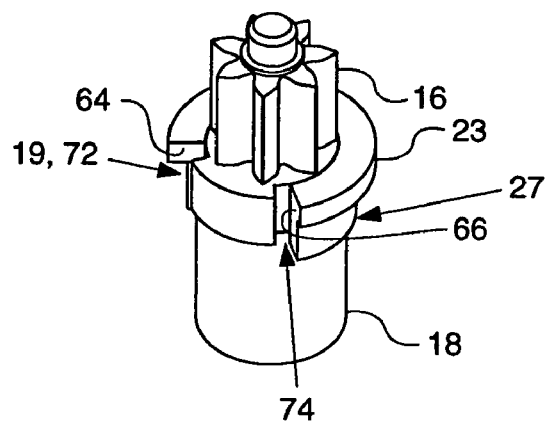
FIG. 4A is a perspective view of the assembled drive shaft and pinion.
Figure 4B:
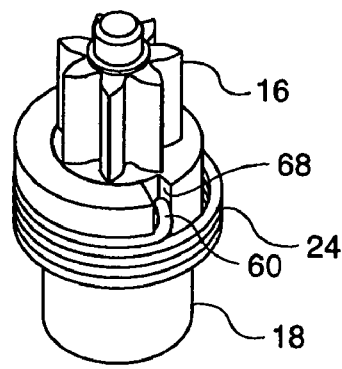
FIG. 4B is a perspective view of the assembled drive shaft, pinion and spring.
Figure 4C:
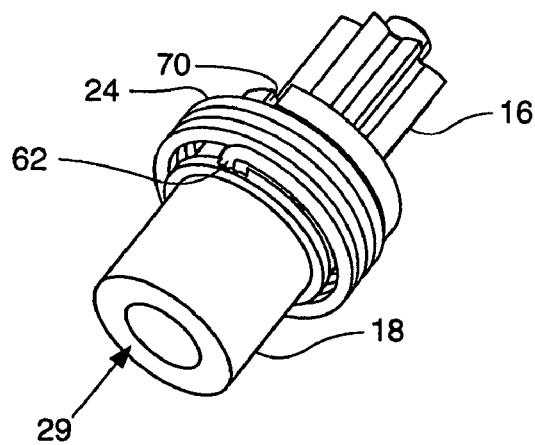
FIG. 4C is a perspective view of the assembled drive shaft, pinion and spring.

FIGS. 4A, 4B and 4C illustrate the assembled pinion 16 and the drive shaft 18. FIG. 4A illustrates only the pinion 16 and the drive shaft 18. FIGS. 4B and 4C illustrate the pinion 16, the drive shaft 18, and the spring 24 as assembled. The drive shaft 18 includes a cut out 19 to receive the pinion 16. When the pinion 16 is assembled with the drive shaft 18, there is provided a first gap 72 and second gap 74. A first tab 60 and a second tab 62 of the spring 24 ride in the respective gaps 72, 74.

The drive shaft 18 includes a first face 64 and a second face 66. Similarly, the pinion 16 includes a third face 68 and a fourth face 70. The tabs 60, 62 ride on the faces 64, 66, 68, 70 to either expand or collapse the spring 24. In a first example, the drive shaft 18 may be rotated in a first direction such that the second face 66 contacts the second tab 62 and moves the tab 62 in the first direction to reduce the diameter of the spring 24. In a second example, the pinion 16 may be rotated in a second direction due to a force being applied to the output gear 20 by the bowden cable 116. When the pinion 16 is rotated in the second direction, the fourth face 70 of the pinion 16 contacts the second tab 62 and moves the second tab 62 in the second direction such that the diameter of the spring 24 is increased. By increasing the diameter of the spring 24, the amount of pressure exerted by the spring 24 on the housing 12 is increased, thereby increasing the friction between the two surfaces. As such, the pinion 16 is effectively braked.

Figure 2:
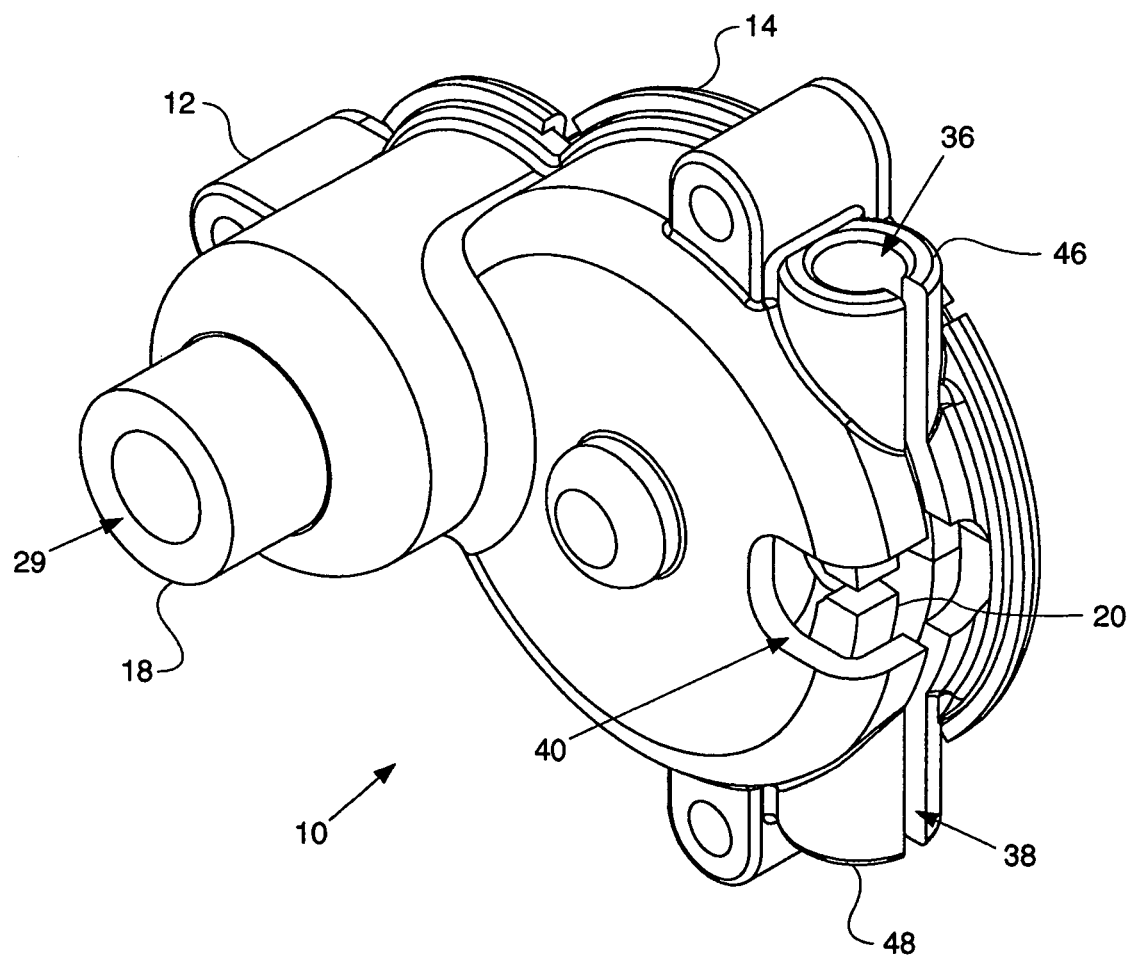
FIG. 2 is a perspective view of an actuator in a first embodiment.

Referring now to FIG. 5, the bowden cable 116 is assembled to the actuator 10. The actuator 10 includes a first channel 46 and a second channel 48. In the depicted embodiment, the first channel 46 is co-axial with the second channel 48 but other configurations may be used. Each channel 46, 48 has a passageway 36 and a slot 38 (as best seen in FIG. 2). In some embodiments, the channels 46, 48 may be counterbored to facilitate reception of the cable sleeve 122. The corresponding opposite first channel 46 and second channel 48 allow for reverse installation of a bowden cable wire 124 so that the actuator 10 may be installed for actuating either clockwise traction or counterclockwise traction in order to accommodate seat design flexibility such as would be useful in installing mirror image actuators on outboard sides of both a driver's and a passenger's side seat.

The output gear 20 has a notch 42 for receiving installation of the bowden cable wire end stop 126. The bowden cable wire 124 would then be wrapped partially around the output gear 20 and lead out through one of the passageways 36. The output gear 20 may include a feature to receive the bowden cable wire 124. For example, the output gear 20 may have a groove 44 to receive the bowden cable wire 124. This groove may be located centrally on the radial surface of the gear and situated between a top set of teeth 43 and a bottom set of teeth 45. In this configuration, rotation of the output gear 20 wraps the bowden cable wire 124 further around the output gear 20 which effects a shortening of the bowden cable wire 124 at the opposite end of the bowden cable 116. This shortening also draws the bowden cable wire 124 through the bowden cable sleeve 122 applying the desired traction to the ergonomic device to which the other end of the bowden cable wire 124 and bowden cable sleeve 122 are attached.

The actuator 10 also includes an opening 40. To assemble the bowden cable 116 to the actuator 10, the bowden cable wire end stop 126 is placed through the opening 40 and into the notch 42. The bowden cable wire 124 is then pulled through the slot 38 until the bowden cable sleeve 122 is beyond the end of the first channel 46 or the second channel 48. The bowden cable sleeve 122 is then placed within the passageway 36 until it contacts a wall 56 (best seen in FIG. 6).

Figure 8:
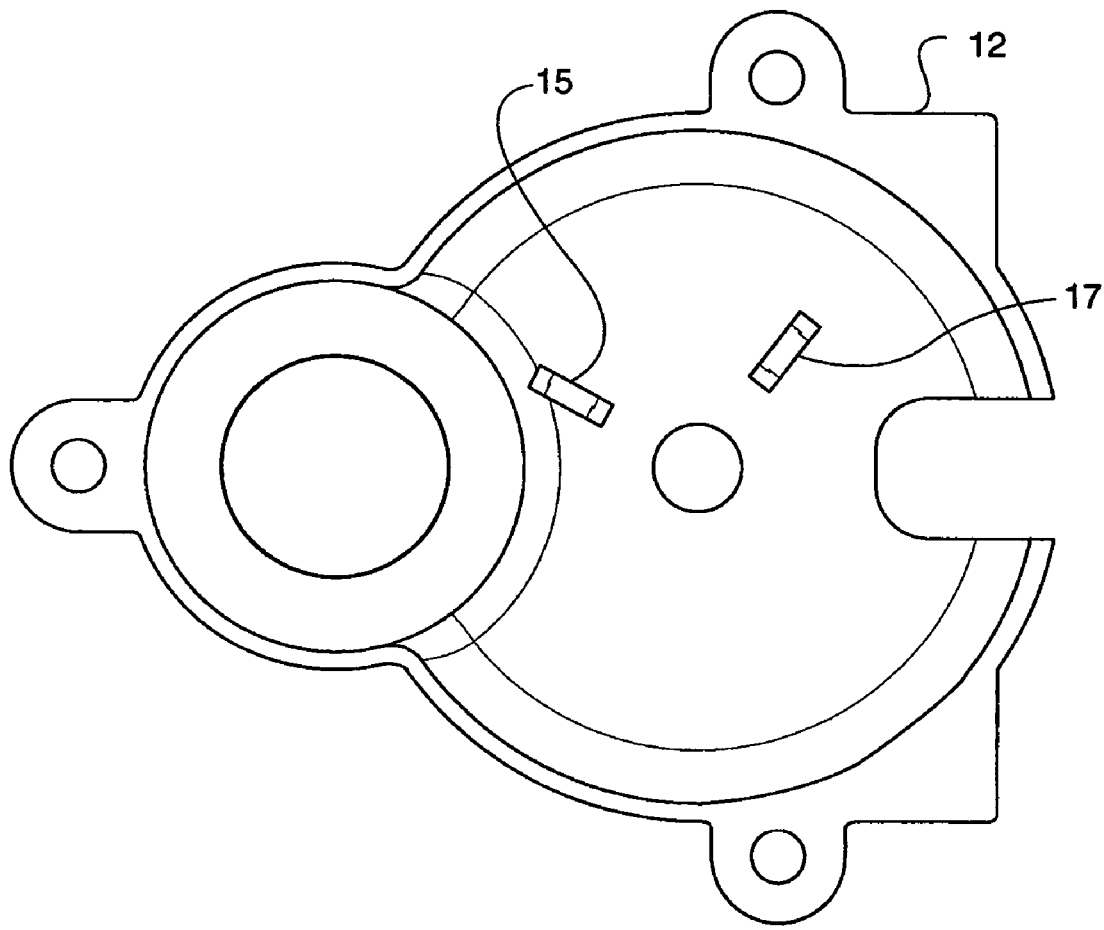
FIG. 8 is a bottom view of the actuator housing in the first embodiment.

FIG. 8 illustrates a bottom view of the housing 12. In the embodiment depicted in FIG. 8, the housing includes a first face 15 and a second face 17. The faces 15, 17 may be mounted on the housing 12, but in the depicted embodiment, the faces 15, 17 are integral with the housing 12. The faces 15, 17 are explained in greater detail below.

Figure 9:
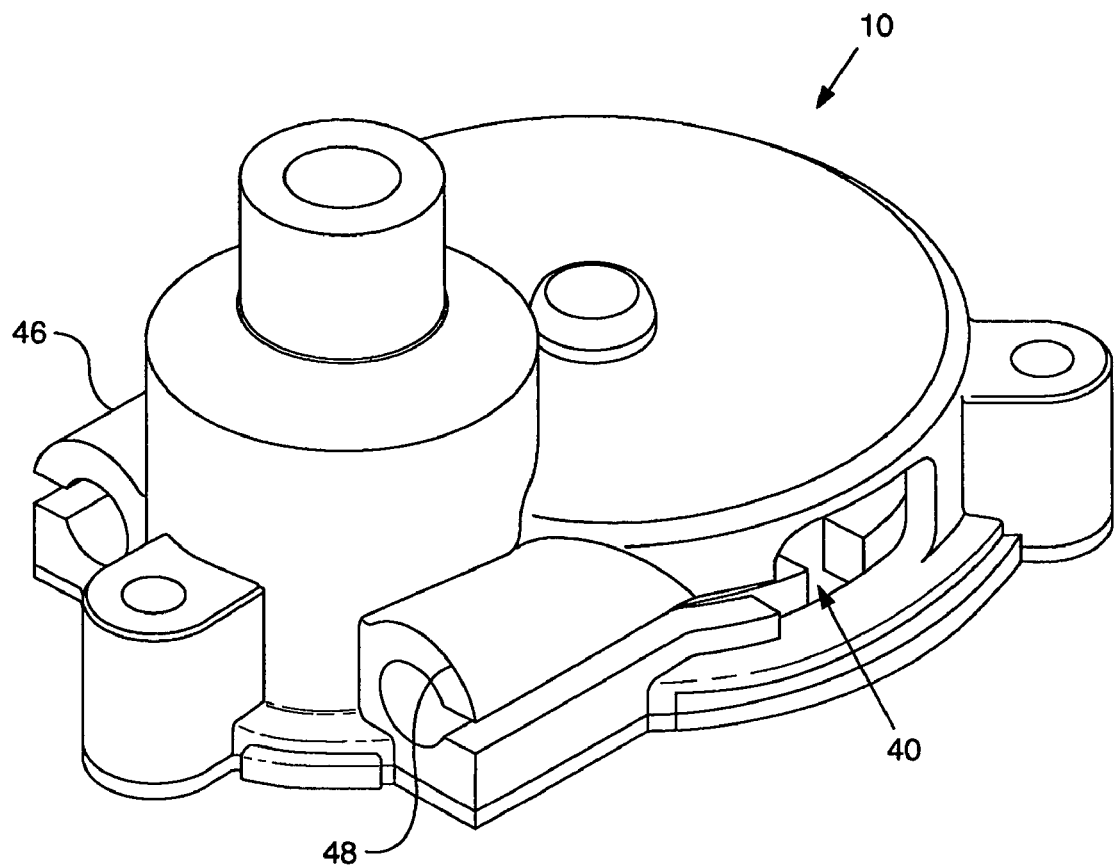
FIG. 9 is a perspective view of the actuator in a second embodiment.

FIG. 9 illustrates a second embodiment of the actuator 10. The second embodiment is very similar to the first embodiment except for the arrangement of the first channel 46 and the second channel 48. In the embodiment depicted in FIG. 9, the first channel 46 is parallel to the second channel 48. To accommodate this configuration, the actuator 10 includes two openings 40, one opposite the other and corresponding with each channel 46, 48.

Figure 10:
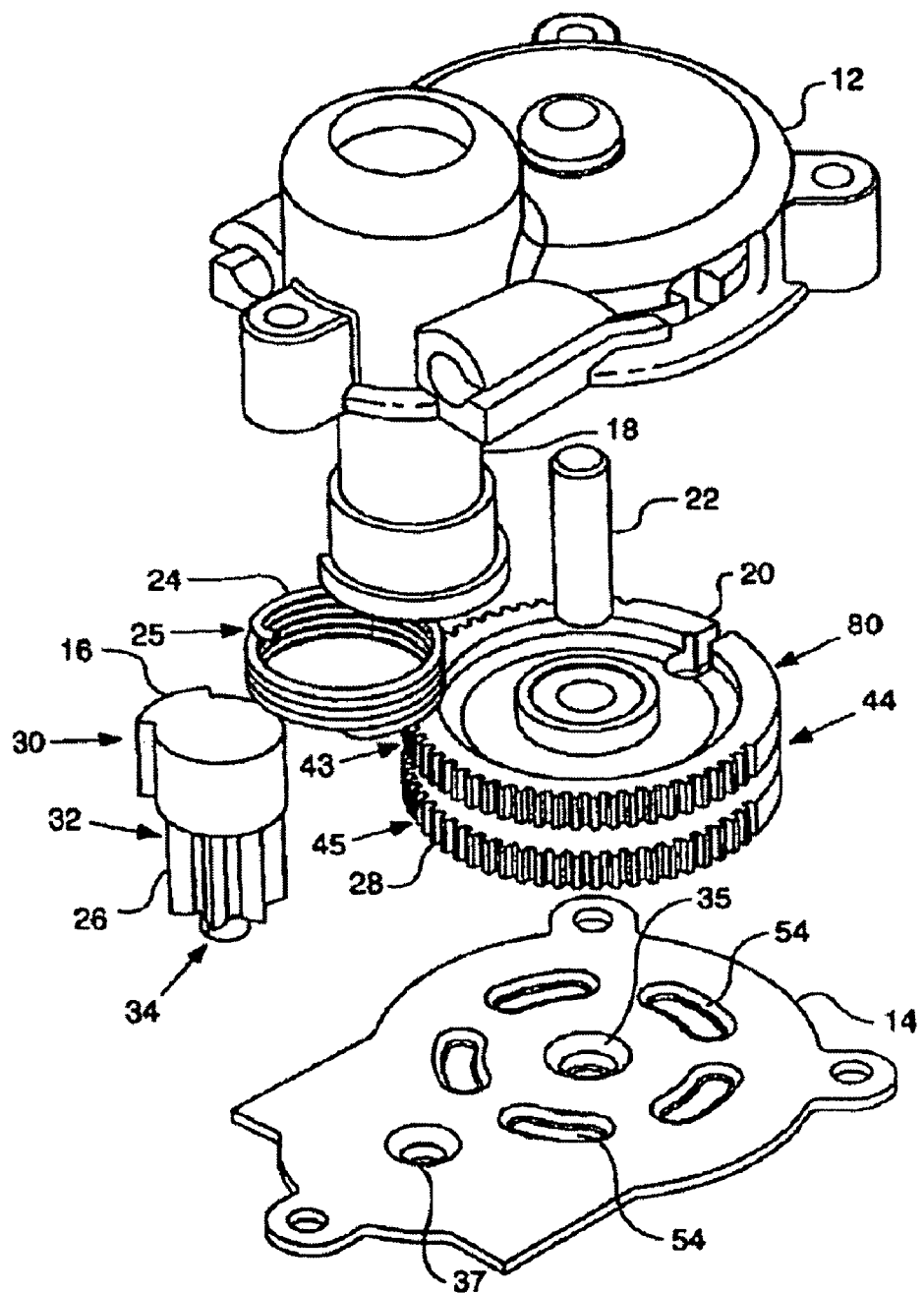
FIG. 10 is an exploded view of the second embodiment.

Typically, the actuator 10 is used to limit the operation of the ergonomic device. For example, if the ergonomic device is a lumbar support, then the actuator 10 may be used to limit the travel of the lumbar support to prevent its over travel. This may be accomplished in several ways. For example, as best seen in FIG. 10, the output gear 20 may include a non-geared portion 80. When the pinion 16 rotates, eventually it will encounter the non-geared portion 80. Because the non-geared portion 80 does not include gear teeth, the pinion 16 will not mesh with the output gear 20 in this location. As such, the pinion 16 will prevent further rotation of the output gear 20, and, thus, prevent further movement of the bowden cable wire 124. As those skilled in the art will understand, the movement of the ergonomic device is directly related to the movement of the traction element, such as the bowden cable. Therefore, by controlling the width and location of the non-geared portion 80, it is possible to limit the movement of the ergonomic device.

Alternatively, and referring once again to FIGS. 2-8, the housing 12 may include the first face 15 and the second face 17. The first face 15 and the second face 17 ride in the recess 33 of the output gear 20. The stop 21 located in the recess 33 limits the rotation of the output gear 20 relative to the first face 15 or the second face 17. In other words, the output gear 20 may rotate in either a first direction until the stop 21 engages the first face 15, or the output gear 20 may rotate in a second direction until the stop 21 engages the second face 17. As an example, the pinion 16 may rotate the output gear 20 in a first direction until the stop 21 engages the first face 15 of the housing 12. As such, the first face 15 will prevent further rotation of the output gear 20, and, thus, prevent further movement of the bowden cable wire 124. As those skilled in the art will understand, the movement of the ergonomic device is directly related to the movement of the traction element, such as the bowden cable. Therefore, by controlling the location of the first face 15, the second face 17, and the stop 21, it is possible to limit the movement of the ergonomic device.

The actuator 10 is assembled by providing a housing, placing a spring over a drive shaft, inserting the spring and the drive shaft into the housing, interlocking a pinion with the drive shaft, inserting a gear shaft into the housing, and placing a drive gear onto the gear shaft and in a driven relationship with the pinion. In some embodiments, an optional step is mounting a cap to the housing. A further step may be to place a tab of the spring within a gap located between the pinion and the drive shaft.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An actuator comprising:
   a. an output gear having a circumferentially extending groove for directly receiving an end portion of a wire of a Bowden cable, said output gear having a wire end stop mount for receiving installation of an end stop of the end portion of the wire of the Bowden cable whereby rotation of said output gear in a direction pulls the wire;
   b. a pinion in driving communication with said output gear such that rotation of said pinion rotates said output gear;
   c. a drive shaft interconnected with said pinion such that rotation of said drive shaft rotates said pinion;
   d. a housing adapted to receive said output gear and said drive shaft;
   e. a coil spring circumjacent said drive shaft and located in a position intermediate said drive shaft and said housing, whereby rotation of said drive shaft causes said coil spring to frictionally disengage from said housing such that said output gear may rotate;
   wherein said output gear has a circumference, wherein a portion of said circumference is geared and said geared portion has gear teeth engaging with gear teeth of said pinion such that rotation of said pinion rotates said output gear, and wherein the other portion of said circumference is non-geared such that when said pinion encounters said non-geared portion said non-geared portion prevents said pinion and said output gear from further rotating.

2. The actuator according to claim 1, further comprising a knob in driving communication with said drive shaft.

3. The actuator according to claim 1, further comprising a cap adapted to mate with said housing.

4. The actuator according to claim 1, wherein said drive shaft includes a shoulder, and said shoulder positions said drive shaft relative to said housing.

5. The actuator according to claim 1, wherein said drive shaft includes a guide surface and a shoulder, and said spring lies over said guide surface and rests upon said shoulder.

6. The actuator according to claim 1, wherein said output gear includes a stop for limiting the rotation of the output gear.

7. The actuator according to claim 1, wherein said housing includes a first channel and a second channel, said first and said second channels being open along their length between the exterior of said housing and the interior of said housing.

8. The actuator according to claim 7, wherein said first channel and said second channel are co-axial.

9. The actuator according to claim 7, wherein said first channel and said second channel are parallel.

10. The actuator according to claim 1, wherein the groove is disposed between a top set of teeth and a bottom set of teeth.

11. An ergonomic device actuator comprising:
   a. a gear directly drawing a first end portion of a wire of a Bowden cable, said gear having a circumferentially extending groove for directly receiving said first end portion of said wire of said Bowden cable, said gear having a wire end stop mount for receiving installation of an end stop of said first end portion of said wire of said Bowden cable whereby rotation of said gear in a direction pulls said wire;
   b. a pinion in driving communication with said gear such that rotation of said pinion rotates said gear;
   c. a drive shaft interconnected with said pinion such that rotation of said drive shaft rotates said pinion;
   d. a housing adapted to receive said gear and said drive shaft;
   e. a spring circumjacent said drive shaft and located in a position intermediate said drive shaft and said housing, whereby rotation of said drive shaft causes said spring to frictionally disengage from said housing such that said gear may rotate;
   f. said wire of said Bowden cable having a second end portion adapted for engagement of an ergonomic device;
   wherein said gear has a circumference, wherein a portion of said circumference is geared and said geared portion has gear teeth, engaging with gear teeth of said pinion such that rotation of said pinion rotates said output gear, and wherein the other portion of said circumference is non-geared such that when said pinion encounters said non-geared portion said non-geared portion prevents said pinion and said gear from further rotating.

12. The ergonomic device actuator according to claim 11, wherein said ergonomic device is a lumbar support.

13. The ergonomic device according to claim 11, wherein said pinion has a key-hole shaped locking portion and said drive shaft has a corresponding inner portion.

14. The ergonomic device according to claim 11, wherein said pinion and said drive shaft form a single component.

15. The ergonomic device according to claim 11, wherein said spring includes at least one tab and said at least one tab selectively engages said pinion.

16. The ergonomic device according to claim 11, wherein said spring is a coil spring.

17. The actuator according to claim 11, wherein said groove is disposed between a top set of teeth and a bottom set of teeth.

* * * * *